(12) United States Patent
Robertson, Jr. et al.

(10) Patent No.: US 9,915,168 B2
(45) Date of Patent: Mar. 13, 2018

(54) FLOWPATH CARTRIDGE LINER AND GAS TURBINE ENGINE INCLUDING SAME

(71) Applicant: UNITED TECHNOLOGIES CORPORATION, Farmington, CT (US)

(72) Inventors: Thomas J. Robertson, Jr., Glastonbury, CT (US); Steven Clarkson, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 104 days.

(21) Appl. No.: 14/728,779

(22) Filed: Jun. 2, 2015

(65) Prior Publication Data

US 2015/0345326 A1    Dec. 3, 2015

Related U.S. Application Data (60) Provisional application No. 62/007,118, filed on Jun. 3, 2014.

(51) Int. Cl.
*F01D 21/04* (2006.01)
*F01D 25/00* (2006.01)
(Continued)

(52) U.S. Cl.
CPC ......... *F01D 25/005* (2013.01); *F01D 21/045* (2013.01); *F01D 25/24* (2013.01);
(Continued)

(58) Field of Classification Search
CPC ...... F01D 24/005; F01D 21/045; F01D 25/24; F01D 21/04; F01D 11/08; F01D 11/12; F01D 11/122; F01D 11/125; F01D 11/127; F02C 7/05; F05D 2240/14; F05D 2300/603; Y02T 50/672

See application file for complete search history.

(56) References Cited

U.S. PATENT DOCUMENTS 5,244,720 A * 9/1993 Leung ................ C03C 14/002
                                            156/155
5,336,044 A * 8/1994 Forrester ............... F01D 21/045
                                            415/196

(Continued)

FOREIGN PATENT DOCUMENTS

EP          0513958 A2      11/1992
EP          1336739 A2 *    8/2003    ........... F01D 21/045
(Continued)

OTHER PUBLICATIONS

European Search Report for Application No. 15170487.1-1610; dated Oct. 9, 2015; 6 pgs.

*Primary Examiner* — Dwayne J White
*Assistant Examiner* — Theodore Ribadeneyra
(74) *Attorney, Agent, or Firm* — Cantor Colburn LLP (57) ABSTRACT

A turbofan engine has a fan having a circumferential array of fan blades. A fan case encircles the fan. There is at least one compressor section, a combustor, and at least one turbine section. The fan case comprises a containment case and a cartridge liner carried therein. A ballistic liner encircles at least a portion of the cartridge liner and is attached thereto.

20 Claims, 5 Drawing Sheets

(51) Int. Cl.
 *F01D 25/24* (2006.01)
 *F02C 7/05* (2006.01)
(52) U.S. Cl.
 CPC ............ *F02C 7/05* (2013.01); *F05D 2240/14* (2013.01); *F05D 2300/603* (2013.01); *Y02T 50/672* (2013.01)

(56) References Cited

U.S. PATENT DOCUMENTS

| | | | | |
|---|---|---|---|---|
| 5,516,257 A * | 5/1996 | Kasprow | ............... | F01D 21/045 415/200 |
| 5,823,739 A * | 10/1998 | Van Duyn | ............ | F01D 21/045 415/9 |
| 6,364,603 B1 * | 4/2002 | Czachor | ............... | F01D 21/045 415/200 |
| 6,394,746 B1 * | 5/2002 | Sathianathan | ........ | F01D 21/045 415/173.4 |
| 6,652,222 B1 * | 11/2003 | Wojtyczka | ............... | B32B 3/12 415/200 |
| 8,061,966 B2 * | 11/2011 | Xie | ....................... | F01D 11/122 415/119 |
| 8,403,624 B2 * | 3/2013 | Xie | ....................... | B29C 70/086 415/173.1 |
| 8,500,390 B2 * | 8/2013 | Wojtyczka | ............ | F01D 21/045 415/173.4 |
| 8,757,958 B2 * | 6/2014 | Lussier | ................. | F01D 21/045 415/197 |
| 2002/0004005 A1 * | 1/2002 | Sathianathan | ........ | F01D 21/045 415/173.1 |
| 2004/0146393 A1 * | 7/2004 | Evans | .................... | B29C 33/40 415/9 |
| 2012/0134774 A1 * | 5/2012 | Clark | ................... | B65D 43/0222 415/9 |
| 2013/0195605 A1 | 8/2013 | Robertson et al. | | |
| 2013/0216367 A1 | 8/2013 | Lussier et al. | | |

FOREIGN PATENT DOCUMENTS

| | | | |
|---|---|---|---|
| EP | 2487335 A2 * | 8/2012 | ............. F01D 21/04 |
| WO | 2013165505 A2 | 11/2013 | |
| WO | 2014093290 A1 | 6/2014 | |

* cited by examiner

FLOWPATH CARTRIDGE LINER AND GAS TURBINE ENGINE INCLUDING SAME

CROSS REFERENCE TO RELATED APPLICATION

This application claims the benefit of and incorporates by reference herein the disclosure of U.S. Serial No. 62/007,118, filed Jun. 3, 2014.

TECHNICAL FIELD OF THE DISCLOSURE

The present disclosure relates generally to a gas turbine engine, and more specifically to a flowpath cartridge liner for a gas turbine engine.

BACKGROUND OF THE DISCLOSURE

In turbofan engines, differences in the fan material versus fan case material may contribute to thermally-induced rub. The fan blades are subject to radial expansion due to inertial forces associated with fan rotation (centrifugal loading). The fan blades are also subject to thermal expansion which is influenced by the material properties of the fan blades (e.g., the coefficient of thermal expansion (CTE)). The fan case is also subject to thermal expansion. In operation, there typically is a gap or clearance between the fan blade tips and the adjacent inboard surface portion of the fan case. On the one hand, it is desirable to keep this gap small to maintain engine efficiency. On the other hand, it is generally desirable to avoid having this gap fully close which produces rub.

The fan case includes a structural member/case comprising a containment case. The containment case may be formed as a composite (e.g., carbon fiber and epoxy resin) to maintain as light a weight as possible. Within the containment case is fitted a replaceable liner cartridge that includes an abradable rub material that will be harmlessly abraded if the fan blade tips contact the abradable rub material. The containment case includes a ballistic liner formed from aramid fiber laminate co-cured to the inner surface of the carbon composite containment case. The ballistic liner is designed to blunt any unplanned blade impact events due to release or partial release of a fan blade.

SUMMARY OF THE DISCLOSURE

In one embodiment, an assembly for a turbofan engine is disclosed, the assembly comprising: a fan having a circumferential array of fan blades; a fan case surrounding the fan and including: a containment case; a liner cartridge inboard of the containment case and mounted to the containment case; and a ballistic liner outboard of at least a portion of the liner cartridge and attached to the liner cartridge.

In a further embodiment of the above, the containment case comprises a composite and the liner cartridge and ballistic liner comprise a metal.

In a further embodiment of any of the above, the composite comprises an organic matrix composite.

In a further embodiment of any of the above, the ballistic liner comprises a material selected from the group consisting of: aluminum, aluminum alloy, and steel.

In a further embodiment of any of the above, the assembly further comprises an abradable liner carried by the liner cartridge.

In a further embodiment of any of the above, the abradable liner is non-metallic.

In a further embodiment of any of the above, the liner cartridge further comprises: a first metallic layer inboard of the ballistic liner, wherein the ballistic liner is attached to the first metallic layer; a metallic honeycomb inboard of the first metallic layer; a second metallic layer inboard of the metallic honeycomb; and an abradable liner attached to the second metallic layer.

In a further embodiment of any of the above, the liner cartridge further comprises: a first metallic layer inboard of the ballistic liner, wherein the ballistic liner is attached to the first metallic layer; a first honeycomb inboard of a forward portion of the first metallic layer; a second honeycomb inboard of the metallic layer aft of the first honeycomb; and an abradable layer inboard of the second honeycomb.

In another embodiment, a fan case is disclosed comprising: a containment case; a liner cartridge inboard of the containment case and mounted to the containment case; and a ballistic liner outboard of at least a portion of the liner cartridge and attached to the liner cartridge.

In a further embodiment of the above, the containment case comprises a composite and the liner cartridge and ballistic liner comprise a metal.

In a further embodiment of any of the above, the composite comprises an organic matrix composite.

In a further embodiment of any of the above, the ballistic liner comprises a material selected from the group consisting of: aluminum, aluminum alloy, and steel.

In a further embodiment of any of the above, the fan case further comprises an abradable liner carried by the liner cartridge.

In a further embodiment of any of the above, the liner cartridge further comprises: a first metallic layer inboard of the ballistic liner, wherein the ballistic liner is attached to the first metallic layer; a metallic honeycomb inboard of the first metallic layer; a second metallic layer inboard of the metallic honeycomb; and an abradable liner attached to the second metallic layer.

In a further embodiment of any of the above, the liner cartridge further comprises: a first metallic layer inboard of the ballistic liner, wherein the ballistic liner is attached to the first metallic layer; a first honeycomb inboard of a forward portion of the first metallic layer; a second honeycomb inboard of the metallic layer aft of the first honeycomb; and an abradable layer inboard of the second honeycomb.

In another embodiment, a fan case liner cartridge is disclosed comprising: a first metallic layer; a ballistic liner outboard of at least a portion of the first metallic layer and attached to the first metallic layer; and an abradable surface inboard of the first metallic layer.

In a further embodiment of the above, the ballistic liner comprise a metal.

In a further embodiment of any of the above, the ballistic liner comprises a metal selected from the group consisting of: aluminum, aluminum alloy, and steel.

In a further embodiment of any of the above, the fan case liner cartridge further comprises: a metallic honeycomb inboard of the first metallic layer; and a second metallic layer inboard of the metallic honeycomb; wherein the abradable liner is attached to the second metallic layer.

In a further embodiment of any of the above, the fan case liner cartridge further comprises: a first honeycomb inboard of a forward portion of the first metallic layer; a second honeycomb inboard of the metallic layer aft of the first honeycomb; and an abradable layer inboard of the second honeycomb. Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
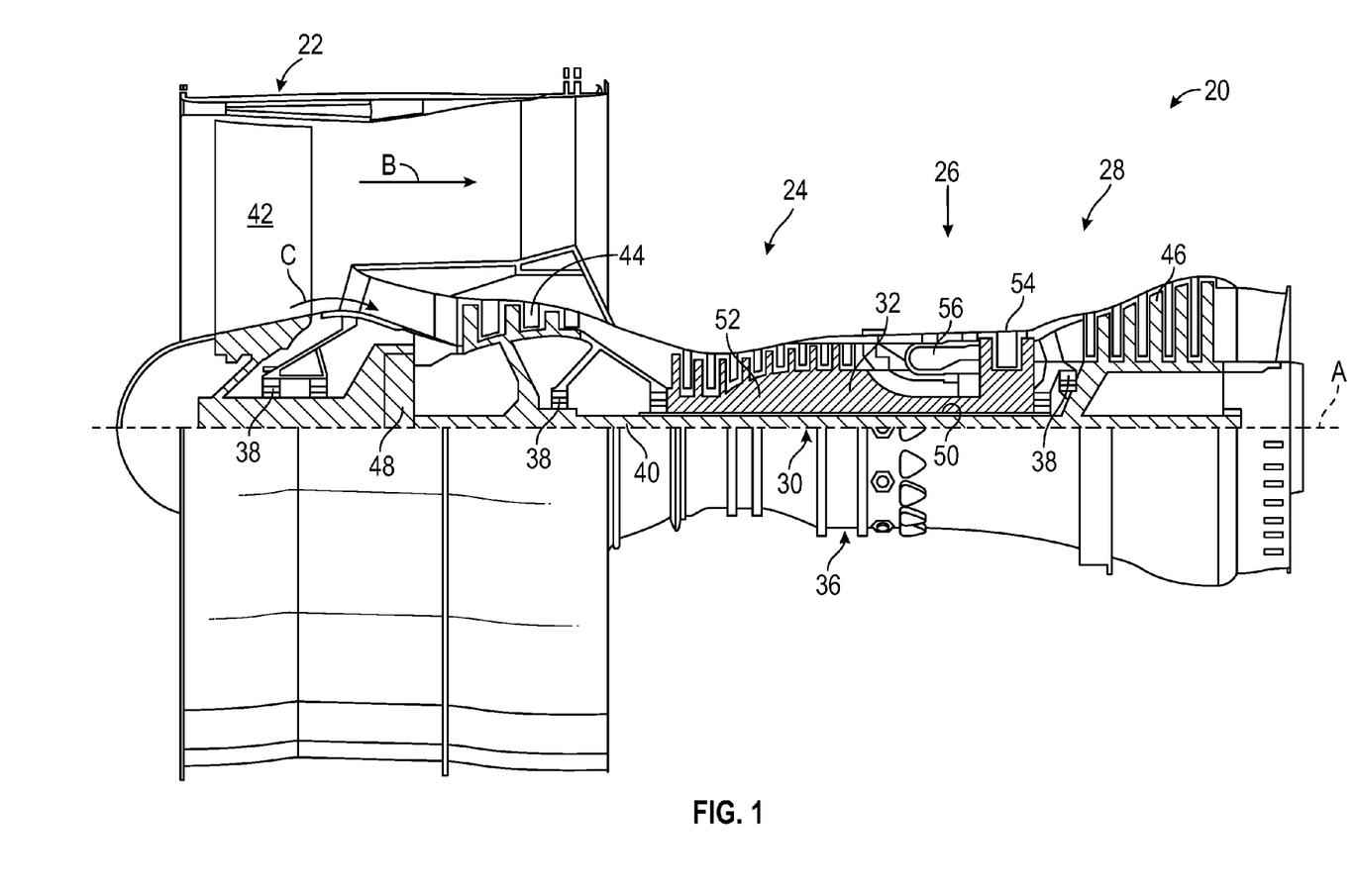
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
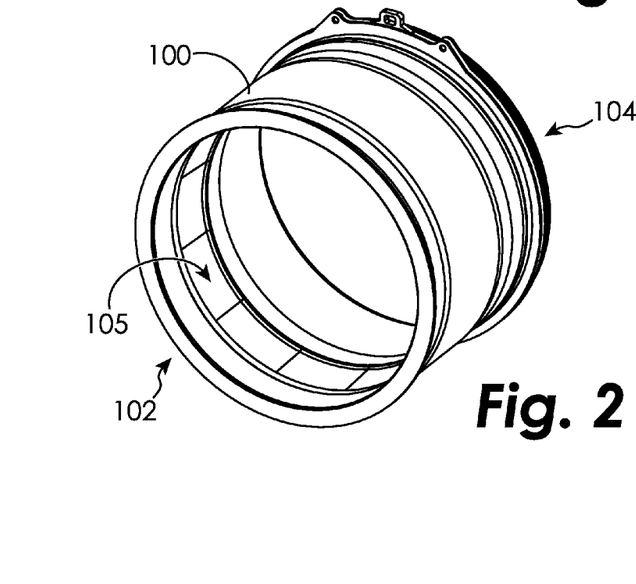
FIG. 2 is a view of a fan containment case and cartridge liner assembly.
Figure 3:
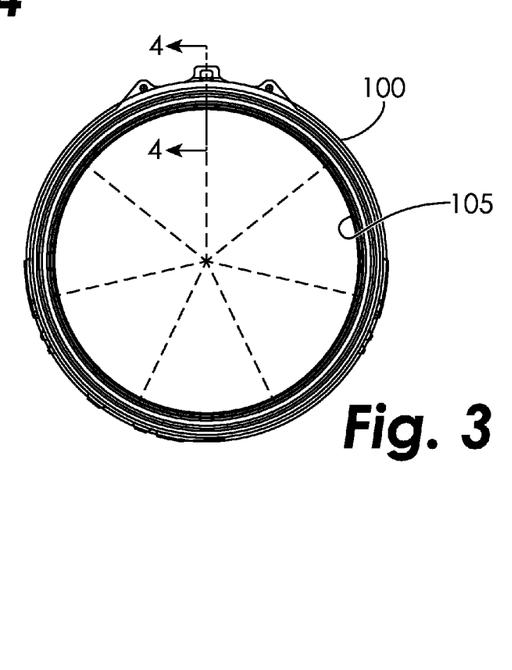
FIG. 3 is a transverse front end view of the assembly of FIG. 2.
Figure 4:
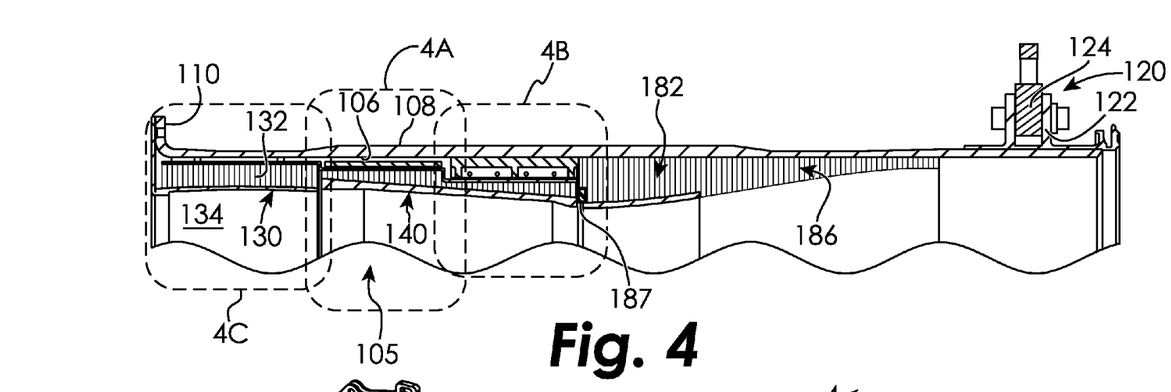
FIG. 4 is a top axial sectional view of the assembly of FIG. 2.
Figure 4A:
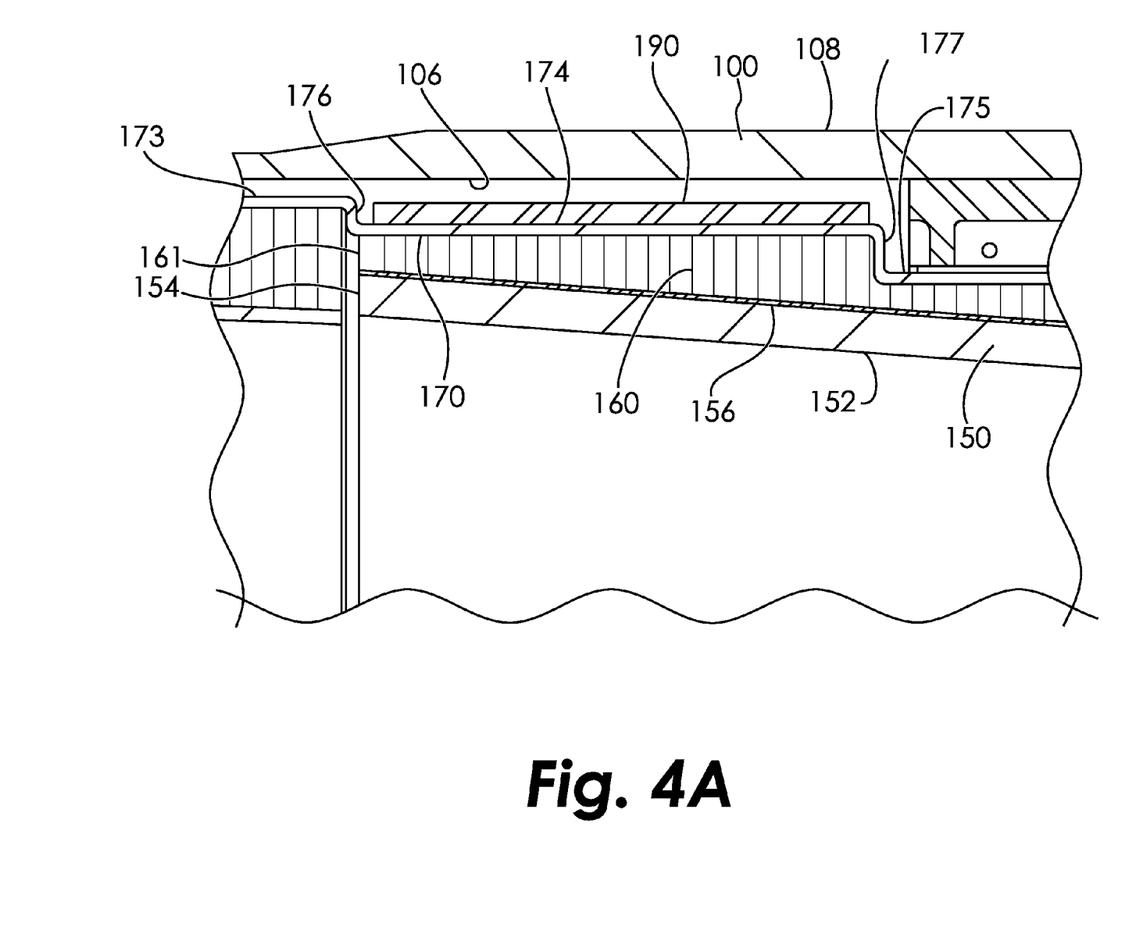
FIG. 4A is an enlarged view of a central portion of a forward cartridge liner region of the assembly of FIG. 4.

The aramid fiber laminate ballistic liner co-cured to the inner surface of the containment case is expensive and difficult to manufacture. An example of such a ballistic liner co-cured to the inner surface of the containment case is disclosed in U.S. Patent Application Publication No. US 2013/0195605, the contents of which are incorporated by reference herein. Disclosed herein are embodiments of a lower cost ballistic liner that may be more easily manufactured and provided within the fan case. FIG. 2 shows further details of the fan case. The fan case includes a structural member/case comprising a containment case 100. The exemplary containment case is formed as a composite (e.g., an organic matrix composite such as carbon fiber and epoxy resin). The exemplary containment case is a full circumference/hoop structure. The exemplary containment case extends from an upstream rim/end 102 to a downstream rim/end 104. The containment case 100 has an inner/inboard surface 106 (FIG. 4A) and an outer/outboard surface 108. The containment case 100 encloses a replaceable liner cartridge 105 (FIGS. 2-4) that comprises a forward acoustic liner 130 and an abradable liner assembly 140 that includes abradable rub material that will be harmlessly abraded if the fan blade tips contact the abradable rub material. The replaceable cartridge liner 105 may be replaced when necessary by removing it in an axially forward direction from the containment case 100.

Proximate the upstream end 102, the containment case 100 has a radially outwardly projecting flange 110 (the forward or "A-flange"). The containment case 100 further includes a mounting ring structure 120 mounted to and encircling the downstream end 104 of the containment case 100. The mounting ring structure 120 may be formed of metal (e.g., titanium or aluminum) and may have a clevis or other mounting structure 122 for mounting to a forward engine mount (e.g. via a mounting lug 124). From upstream-to-downstream, structures are mounted to the inboard surface 106 to define locally the outboard boundary of the air flowpath through the containment case 100. As is discussed further below, several of these structures are portions of a pre-assembled self-contained replaceable liner cartridge 105. Proximate the upstream end 102, is the forward acoustic liner 130. This may be formed of a honeycomb (e.g., a potted honeycomb 132 (e.g., aluminum alloy) having an aluminum liner 134).

Downstream/aft of the forward acoustic liner 130 is the abradable liner assembly 140. The abradable liner assembly 140 (FIGS. 4A-B) includes an abradable rub material 150 (e.g., filled epoxy with aramid honeycomb) having an inboard (radially) surface 152 in close facing proximity to the fan blade tips. The outboard (radially) surface of the abradable rub material 150 is mounted to the inboard surface of an aluminum (aluminum alloy) septum 156. The exemplary aluminum septum 156 is essentially full annulus (either continuous as a single piece or as rigidly attached segments). The aluminum septum 156 forms an inboard liner of a wedge honeycomb 160. In the exemplary embodiment, the septum 156 and honeycomb 160 are circumferentially segmented. In alternative embodiments, one or both may be continuous. An outboard boundary of the wedge honeycomb 160 may bear a circumferentially continuous aluminum alloy liner 170. The exemplary liner 170 forms the unifying outer structure of the replaceable liner cartridge 105 as is further described below. The wedge honeycomb 160 is a wedge in that its radial span or thickness increases from upstream to downstream to provide local radial convergence (upstream to downstream) of the surface 152.

Figure 4B:
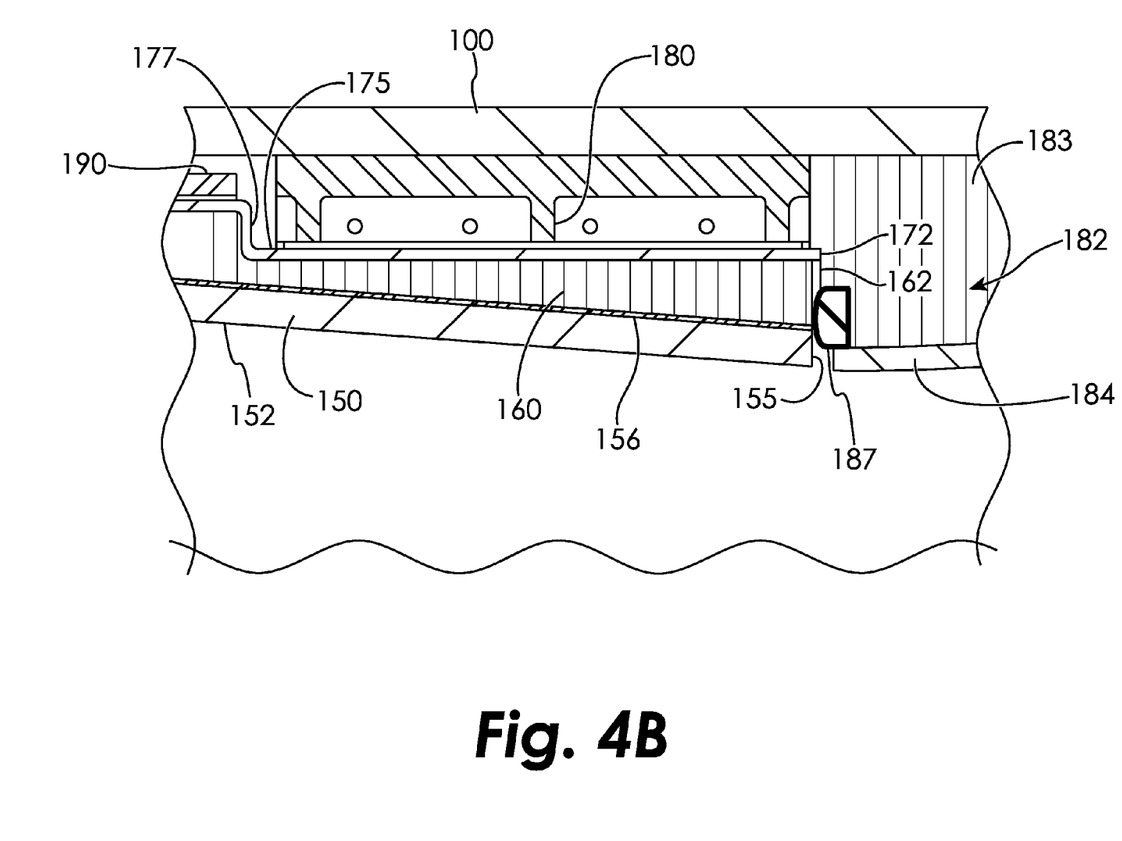
FIG. 4B is an enlarged view of an aft portion of the forward cartridge liner region of the assembly of FIG. 4.

The abradable rub material 150 extends from a leading edge 154 (FIG. 4A) to a trailing edge/rim 155 (FIG. 4B). The wedge honeycomb 160 extends from a leading edge/rim 161 (FIG. 4A) to a trailing edge/rim 162 (FIG. 4B). In the exemplary embodiment the edges 160 and 161 are axially aligned with corresponding ends of the abradable rub material 150 and septum 156. The exemplary liner 170 extends from a forward/upstream end/rim 171 (FIG. 4C) to an aft/downstream end/rim 172 (FIG. 4B). From upstream-to-downstream, the exemplary liner 170 has three progressively radially inwardly staggered sections 173, 174, and 175 (FIG. 4A) separated by annular shoulders 176 (FIG. 4A) and 177 (FIG. 4B).

Figure 4C:
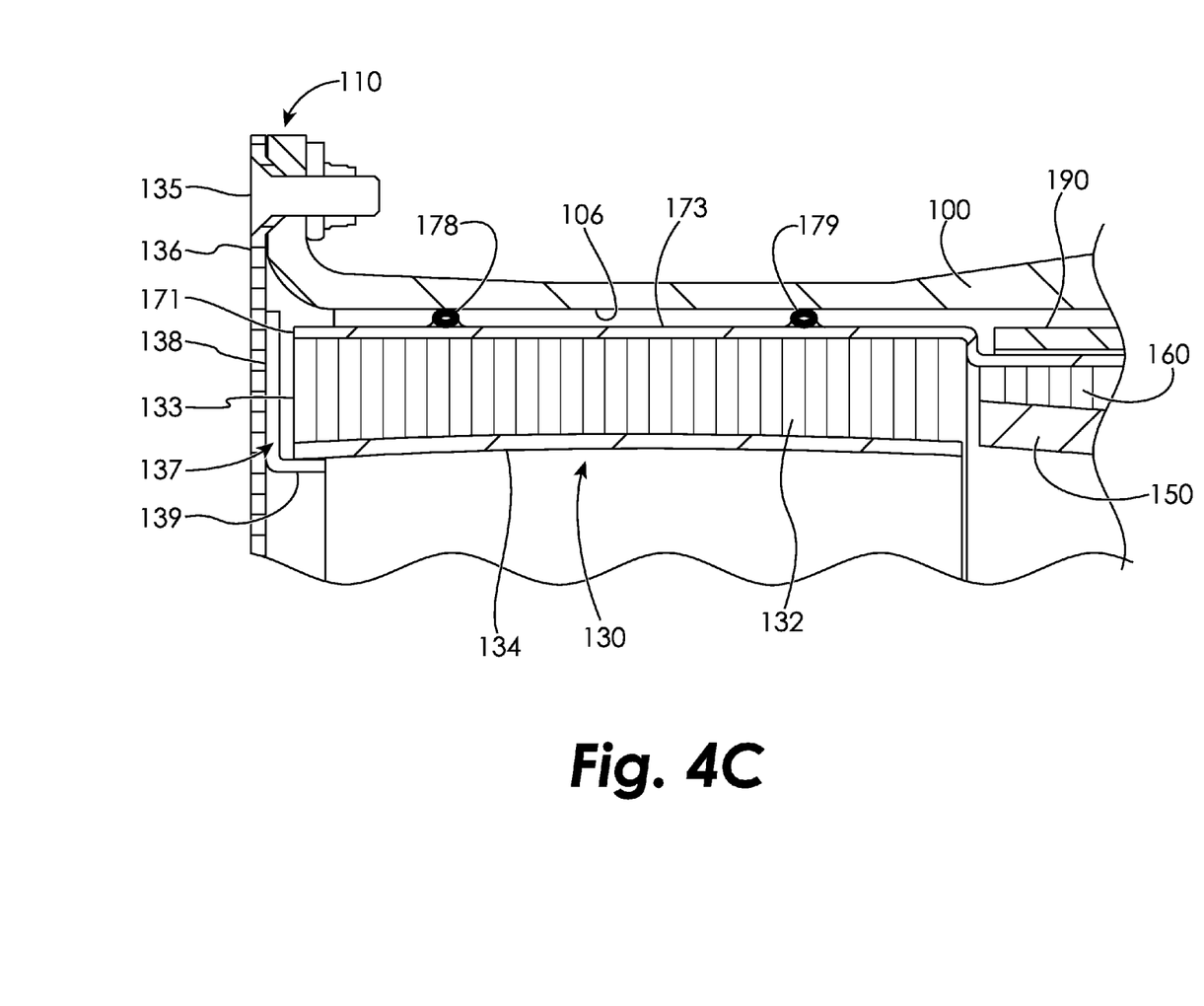
FIG. 4C is an enlarged view of a forward portion of the forward cartridge liner region of the assembly of FIG. 4.

Referring to FIG. 4C, the upstream section 173 of the exemplary liner 170 is along the outer (radially outboard) surface of the honeycomb 132, with the upstream end/rim 171 axially aligned with the upstream end/rim 133 of the honeycomb 132. This upstream section 173 is positioned relative to the inboard surface 106 of the containment case 100 via radial dampers 178 and 179. Exemplary radial dampers are constructed from silicone rubber or other suitable damping material. They may be adhesively bonded to the outboard surface of the liner 170 (e.g., prior to installation of the replaceable liner cartridge 105). Exemplary dampers may be full annulus or segmented in their axial positioning and circumferential extent may be tailored to break-up the natural frequency modes that may be found in the replaceable liner cartridge 105 based on the frequency response requirements. If the replaceable liner cartridge 105 has sufficient stiffness, such dampers may not be required.

To longitudinally and radially retain the forward portion of the replaceable liner cartridge 105 (e.g., the forward portion of the forward acoustic liner 130), a flange structure may be provided (e.g., via the circumferentially segmented capture plate 136) having an outboard portion with the aft face secured against a forward face of the flange 110 (e.g., via fasteners such as bolts 135). The exemplary capture plate 136 extends from an outboard (outer diameter or OD) periphery to an inboard (inner diameter or ID) periphery. The flange further includes a close out plate 137 having, in axial section, a generally L-shape/section with a radially outwardly-extending leg 138 and an aftward/downstream extending foot 139 (forming a sleeve structure). The close out plate 137 may similarly be circumferentially segmented and an outboard portion of the leg 138 may be secured to an inboard portion of the capture plate 136 (e.g., via bonding and riveting). An outboard face of the foot 139 captures a forward portion of an inboard surface of the forward acoustic liner 130 (e.g., of the liner 134).

Referring once again to FIG. 4B, anti-rotation features 180 may be bonded to the containment case 100. Downstream/aft of the honeycomb wedge 160 and abradable rub material 150 is an ice impact liner 182 (e.g., formed of an aluminum honeycomb 183) with an impact resistant flowpath liner 184 (e.g., aramid fiber). Downstream of the ice impact liner 182 is an acoustic liner (assembly) 186 (FIG. 4) which may include an aluminum honeycomb and an inboard/ID liner (e.g., of aluminum or aramid fiber). A recirculation seal/damper 187 may be positioned axially between the ice impact liner 182 and the honeycomb wedge 160 (e.g., to help maintain aero-smoothness and damp movement of the replaceable liner cartridge 105 in the axial direction (and optionally in the radial direction)).

A ballistic liner 190 may be provided to blunt the impact of dislodged fan blades 42. The ballistic liner 190 may be mounted to the exemplary liner 170 in the region radially outward of the fan blades 42. The ballistic liner 190 may be formed from a material having the same or similar coefficient of thermal expansion (CTE) as the exemplary liner 170 and honeycomb wedge 160, such that expansion and contraction of these layers will not impose stress on adjacent layers. For example, if the exemplary liner 170 and honeycomb wedge 160 are formed from aluminum, the ballistic liner 190 may also be formed from aluminum, aluminum alloy, or from steel or other material having a sufficiently similar CTE. The thickness of the ballistic liner 190 will be driven by the expected loads to be blunted in the event of a fan blade 42 failure. The ballistic liner 190 may be attached to the exemplary liner 170 by any desired means, such welded, riveted, or snapped (interference fit) onto the exemplary liner 170, to name a few non-limiting examples. The exemplary liner 170 may also be machined to comprise a larger radial thickness in the region 190 rather than attaching a separate piece. In some embodiments, the ballistic liner 190 is added to the exemplary liner 170 prior to forming the shape of the exemplary liner 170.

Some embodiments of the ballistic liner 190 may be lower cost and simpler to manufacture than the prior design aramid fiber layer co-cured with the composite containment case 100. Some embodiments of the ballistic liner 190 may absorb all of the impact of a dislodged blade, allowing replacement of only the replaceable liner cartridge 105 and reuse of the containment case 100. The presently disclosed embodiments do not require the replaceable liner cartridge 105 to slide passed the ballistic liner during installation as with the prior design. Finally, some embodiments of the ballistic liner 190 provide additional stiffness to the cartridge and may therefore improve the modal response of the cartridge.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. An assembly for a turbo fan engine, the assembly comprising:
    a fan having a circumferential array of fan blades;
    a fan case surrounding the fan and including:
    a containment case;
    a liner cartridge inboard of the containment case and mounted to the containment case, wherein the liner cartridge includes a first metallic layer with a first coefficient of thermal expansion, and wherein the first metallic layer has three progressively radially inwardly staggered sections separated by annular shoulders; and
    a ballistic liner with a second coefficient of thermal expansion, the ballistic liner disposed outboard of at least a portion of the liner cartridge and attached to the liner cartridge wherein the first coefficient of thermal expansion of the first metallic layer and the second coefficient of thermal expansion of the ballistic liner will not impose stresses on the first metallic layer and the ballistic liner as the ballistic liner and the liner cartridge are exposed to different temperatures.

2. The assembly of claim 1, wherein the containment case comprises a composite and the liner cartridge and ballistic liner comprise a metal and the ballistic liner is positioned between the annular shoulders.

3. The assembly of claim 2 wherein: the composite comprises an organic matrix composite.

4. The assembly of claim 1, wherein the ballistic liner comprises a material selected from the group consisting of: aluminum, aluminum alloy, and steel.

5. The assembly of claim 1 further comprising: an abradable liner carried by the liner cartridge.

6. The assembly of claim 5 wherein the abradable liner is non-metallic.

7. The assembly of claim 1 wherein the liner cartridge further comprises:
    wherein the first metallic layer is inboard of the ballistic liner, wherein the ballistic liner is attached to the first metallic layer;
    a metallic honeycomb inboard of the first metallic layer;
    a second metallic layer inboard of the metallic honeycomb; and
    an abradable liner attached to the second metallic layer.

8. The assembly of claim 1 wherein the liner cartridge further comprises:
    wherein the first metallic layer is inboard of the ballistic liner, wherein the ballistic liner is attached to the first metallic layer;
    a first honeycomb inboard of a forward portion of the first metallic layer;
    a second honeycomb inboard of the metallic layer aft of the first honeycomb;
    an abradable layer inboard of the second honeycomb; and
    wherein radial dampers are disposed between the forward portion of the first metallic layer and the containment case and a recirculation seal is positioned against a trailing portion of the second honeycomb.

9. A fan case comprising:
    a containment case;
    a liner cartridge inboard of the containment case and mounted to the containment case, wherein the liner cartridge includes a first metallic layer with a first coefficient of thermal expansion, and wherein the first metallic layer has three progressively radially inwardly staggered sections separated by annular shoulders; and
    a ballistic liner with a second coefficient of thermal expansion, the ballistic liner disposed outboard of at least a portion of the liner cartridge and attached to the liner cartridge wherein the first coefficient of thermal expansion of the first metallic layer and the second coefficient of thermal expansion of the ballistic liner will not impose stresses on the first metallic layer and the ballistic liner as the ballistic liner and the liner cartridge are exposed to different temperatures.

10. The fan case of claim 9, wherein the containment case comprises a composite and the liner cartridge and ballistic liner comprise a metal and the ballistic liner is positioned between the annular shoulders.

11. The fan case of claim 10 wherein: the composite comprises an organic matrix composite.

12. The fan case of claim 9, wherein the ballistic liner comprises a material selected from the group consisting of: aluminum, aluminum alloy, and steel.

13. The fan case of claim 9 further comprising: an abradable liner carried by the liner cartridge.

14. The fan case of claim 9 wherein the liner cartridge further comprises:
    wherein the first metallic layer is inboard of the ballistic liner, wherein the ballistic liner is attached to the first metallic layer;
    a metallic honeycomb inboard of the first metallic layer;
    a second metallic layer inboard of the metallic honeycomb; and an abradable liner attached to the second metallic layer.

15. The fan case of claim 9 wherein the liner cartridge further comprises:
    wherein the first metallic layer is inboard of the ballistic liner, wherein the ballistic liner is attached to the first metallic layer;

a first honeycomb inboard of a forward portion of the first metallic layer;

a second honeycomb inboard of the metallic layer aft of the first honeycomb;

an abradable layer inboard of the second honeycomb; and wherein radial dampers are disposed between the forward portion of the first metallic layer and the containment case and a recirculation seal is positioned against a trailing portion of the second honeycomb.

16. A fan case liner cartridge comprising:

a first metallic layer with a first coefficient of thermal expansion, wherein the first metallic layer has three progressively radially inwardly staggered sections separated by annular shoulders; and a ballistic liner with a second coefficient of thermal expansion, the ballistic liner disposed outboard of at least a portion of the first metallic layer and attached to the first metallic layer, wherein the first coefficient of thermal expansion of the first metallic layer and the second coefficient of thermal expansion of the ballistic liner will not impose stresses on the first metallic layer and the ballistic liner as the ballistic liner and the liner cartridge are exposed to different temperatures.

17. The fan case liner cartridge of claim 16, wherein the ballistic liner comprise a metal and the ballistic liner is positioned between the annular shoulders.

18. The fan case liner cartridge of claim 17, wherein the ballistic liner comprises a metal selected from the group consisting of: aluminum, aluminum alloy, and steel.

19. The fan case liner cartridge of claim 16 further comprising:

a metallic honeycomb inboard of the first metallic layer; and a second metallic layer inboard of the metallic honeycomb;

wherein an abradable liner is attached to the second metallic layer.

20. The fan case liner cartridge of claim 16 further comprising:

a first honeycomb inboard of a forward portion of the first metallic layer;

a second honeycomb inboard of the metallic layer aft of the first honeycomb; and an abradable layer inboard of the second honeycomb; and wherein radial dampers are disposed against an outboard surface of the forward portion of the first metallic layer and a recirculation seal is positioned against a trailing portion of the second honeycomb.

* * * * *